United States Patent [19]
Hori

[11] Patent Number: 6,020,873
[45] Date of Patent: Feb. 1, 2000

[54] LIQUID CRYSTAL DISPLAY APPARATUS WITH ARBITRARY MAGNIFICATION OF DISPLAYED IMAGE

[75] Inventor: Yoshihiko Hori, Tokyo, Japan

[73] Assignee: NEC Corporation, Tokyo, Japan

[21] Appl. No.: 08/897,118

[22] Filed: Jul. 18, 1997

[30] Foreign Application Priority Data

Jul. 19, 1996 [JP] Japan ................................. 8-208934

[51] Int. Cl.[7] ................................................... H04N 5/02
[52] U.S. Cl. ........................... 345/132; 348/448; 348/458
[58] Field of Search ........................... 345/132; 348/448, 348/458

[56] References Cited

U.S. PATENT DOCUMENTS

| 4,426,661 | 1/1984 | Okada et al. | 348/448 |
| 5,719,594 | 2/1998 | Potu | 345/132 |
| 5,736,971 | 4/1998 | Shirai | 348/448 |

FOREIGN PATENT DOCUMENTS

| 62-138893 | 6/1987 | Japan . |
| 63-153292 | 10/1988 | Japan . |
| 5100640 | 4/1993 | Japan . |
| 5-150749 | 6/1993 | Japan . |
| 5303362 | 11/1993 | Japan . |

*Primary Examiner*—Bipin Shalwala
*Assistant Examiner*—Vincent E. Kovalick
*Attorney, Agent, or Firm*—Sughrue, Mion, Zinn, Macpeak & Seas, PLLC

[57] ABSTRACT

In a liquid crystal display apparatus including a plurality of gate lines, a plurality of source lines, a plurality of liquid crystal pixels, and a gate line driving circuit, for driving the gate lines, the gate line driving circuit is formed by shift registers for shifting a vertical start pulse signal in response to a clock signal including first pulses and second pulses. Also, a circuit generates said first pulses at an interval of H/a where H is a time period of a horizontal synchronization signal and "a" is a positive integer. Further, a circuit generates the second pulses associated with "c" pulses of "a·b" successive ones of the first pulses where "b" and "c" are positive integers and "c" is smaller than "b".

8 Claims, 18 Drawing Sheets

LIQUID CRYSTAL DISPLAY APPARATUS WITH ARBITRARY MAGNIFICATION OF DISPLAYED IMAGE

BACKGROUND OF THE INVENTION

1. Field of the Invention

The present invention relates to an active matrix liquid crystal display (LCD) apparatus, and more particularly, to an active matrix LCD apparatus for displaying images of different magnifications.

2. Description of the Related Art

Usually, in a first prior art active matrix LCD apparatus, the number of scanning lines is fixed. This will be explained later in detail. Therefore, when a television image having a small number of scanning lines is displayed on the active matrix LCD apparatus, an interpolation operation is carried out to increase the number of scanning lines. This is complex to control.

In a second prior art active matrix LCD apparatus (see JP-A-62-138893), a clock multiplexing circuit is provided between a controller and a gate line driving circuit for driving gate lines. Therefore, a clock signal obtained by the clock multiplexing circuit is formed by pulse groups each including two or more pulses, and the period of the pulse groups is equal to a one line scan time period. As a result, two or more of the gate lines are approximately simultaneously driven. Thus, the displayed area of the LCD panel in the longitudinal direction can be enlarged. This also will be explained later in detail.

In the second prior art apparatus, however, since the magnification of the displayed area in the longitudinal direction is an integer, the displayed area may be too much smaller or too much larger than the LCD panel, in other words, the displayed area hardly coincides with the LCD panel.

In a third prior art active matrix LCD apparatus (see JP-A-5-100640), the outputs of D flip-flops of the gate line driving circuit are connected to buffers via clocked inverters instead of the clock multiplexing circuit of the second prior art apparatus. This also will be explained later in detail.

In the third prior art apparatus, however, although the magnification of the displayed area in the longitudinal direction can be arbitrary, this magnification is fixed. Also, the clocked inverters increase the manufacturing cost. Further, a write operation cannot accurately be carried out for the apparatus which is of a gate storage type where a storage capacitor is formed on an adjacent gate line.

In a fourth prior art active matrix LCD apparatus (see JP-A-5-303362), switches are provided instead of the clocked inverters of the third prior art apparatus. This will also be explained later in detail.

In the fourth prior art apparatus, however, although the magnification of the displayed area in the longitudinal direction can be arbitrary, this magnification is fixed. Also, the switches increase the manufacturing cost. Further, the maximum magnification is 2, and therefore, it is impossible to obtain a magnification larger than 2.

SUMMARY OF THE INVENTION

It is an object of the present invention to provide an active matrix LCD apparatus capable of an arbitrary magnification of a displayed image.

According to the present invention in a liquid crystal display apparatus including a plurality of gate lines, a plurality of source lines, a plurality of liquid crystal pixels, and a gate line driving circuit, for driving the gate lines, the gate line driving circuit is formed by shift registers for shifting a vertical start pulse signal in response to a clock signal including first pulses and second pulses. Also, a circuit generates the first pulses at an interval of H/a where H is a time period of a horizontal synchronization signal and "a" is a positive integer. Further, another circuit generates the second pulses associated with "c" pulses of "a·b" successive ones of the first pulses where "b" and "c" are positive integers and "c" is smaller than "b".

Thus, the following magnification M of a displayed image can be obtained:

$$M = a + c/b.$$

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENTS

Before the description of the preferred embodiments, prior art active matrix LCD apparatuses will be explained with reference to FIGS. 1 through 9.

Figure 1:
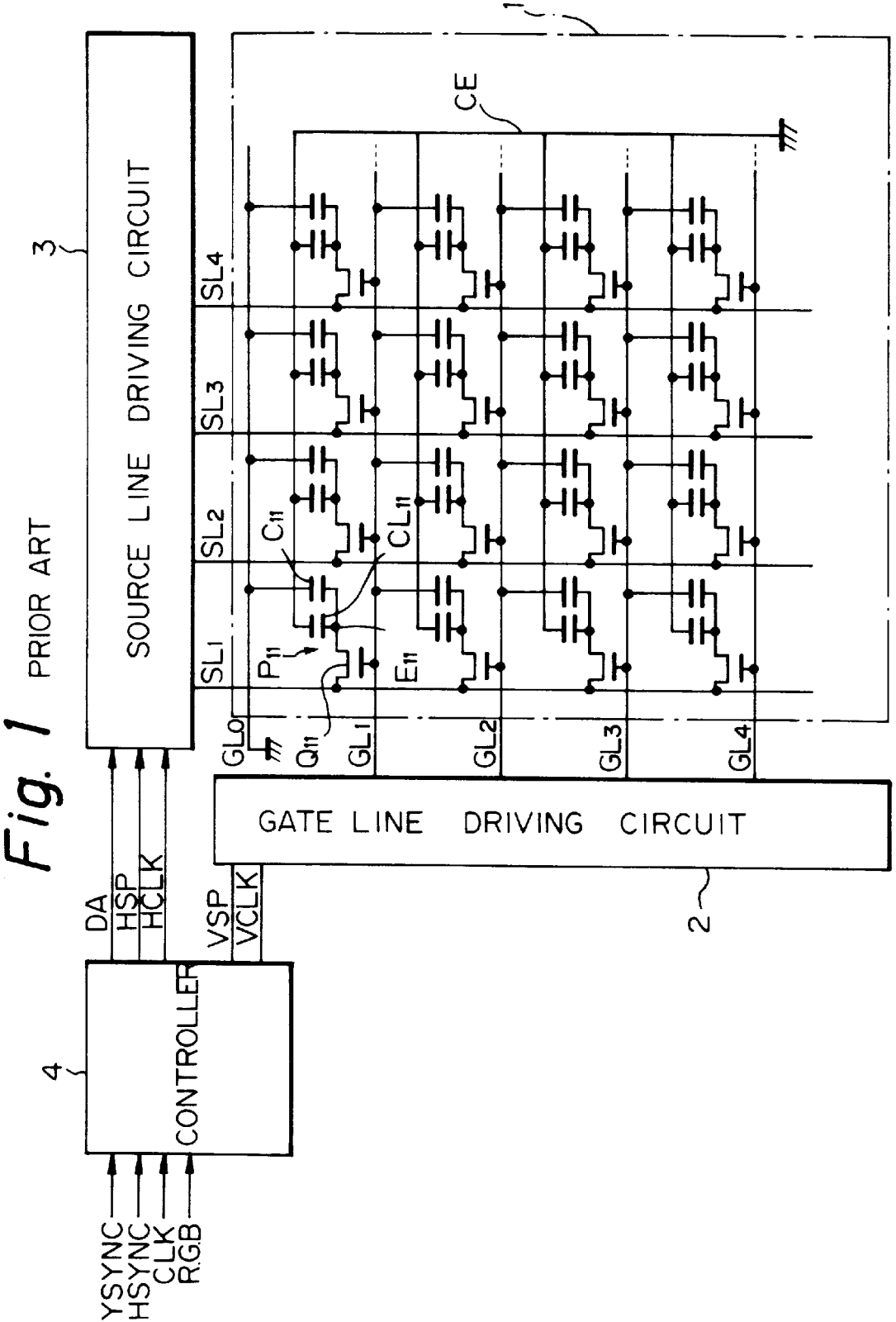
FIG. 1 is a circuit diagram illustrating a first prior art active matrix LCD apparatus.

In FIG. 1, which illustrates a first prior art active matrix LCD apparatus, reference numeral 1 designates an LCD panel which has gate lines $GL_1$, $GL_2$, . . . driven by a gate line driving circuit 2, source lines $SL_1$, $SL_2$, ... driven by a source line driving circuit 3, and pixels $P_{11}$, $P_{12}$, ..., each connected to one of the gate lines $GL_1$, $GL_2$, ... and one of the source lines $SL_1$, $SL_2$, .... Also, each of the pixels, such as $P_{11}$, is formed by a TFT $Q_{11}$, a liquid crystal cell $LC_{11}$ and a storage capacitor $C_{11}$. In this case, the liquid crystal cell $LC_{11}$ is formed by a pixel electrode $E_{11}$ and a common counter electrode CE, and the storage capacitor $C_{11}$ is formed by the pixel electrode $E_{11}$ and a gate line $GL_0$ adjacent to the gate line $GL_1$. That is, the pixels are of a gate storage type. In this case, the gate line $GL_0$ is grounded.

The gate line driving circuit 2 receives a start pulse signal VSP and a clock signal VCLK from a controller 4 to drive the gate lines $GL_1$, $GL_2$, .... Also, the source line driving circuit 3 receives a data signal DA, a start pulse signal HSP and a clock signal HCLK from the controller 4 to drive the source lines $SL_1$, $SL_2$, ....

The controller 4 receives a vertical synchronization signal VSYNC, a horizontal synchronization signal HSYNC, a clock signal CLK and video signals R, G and B.

Figure 2:
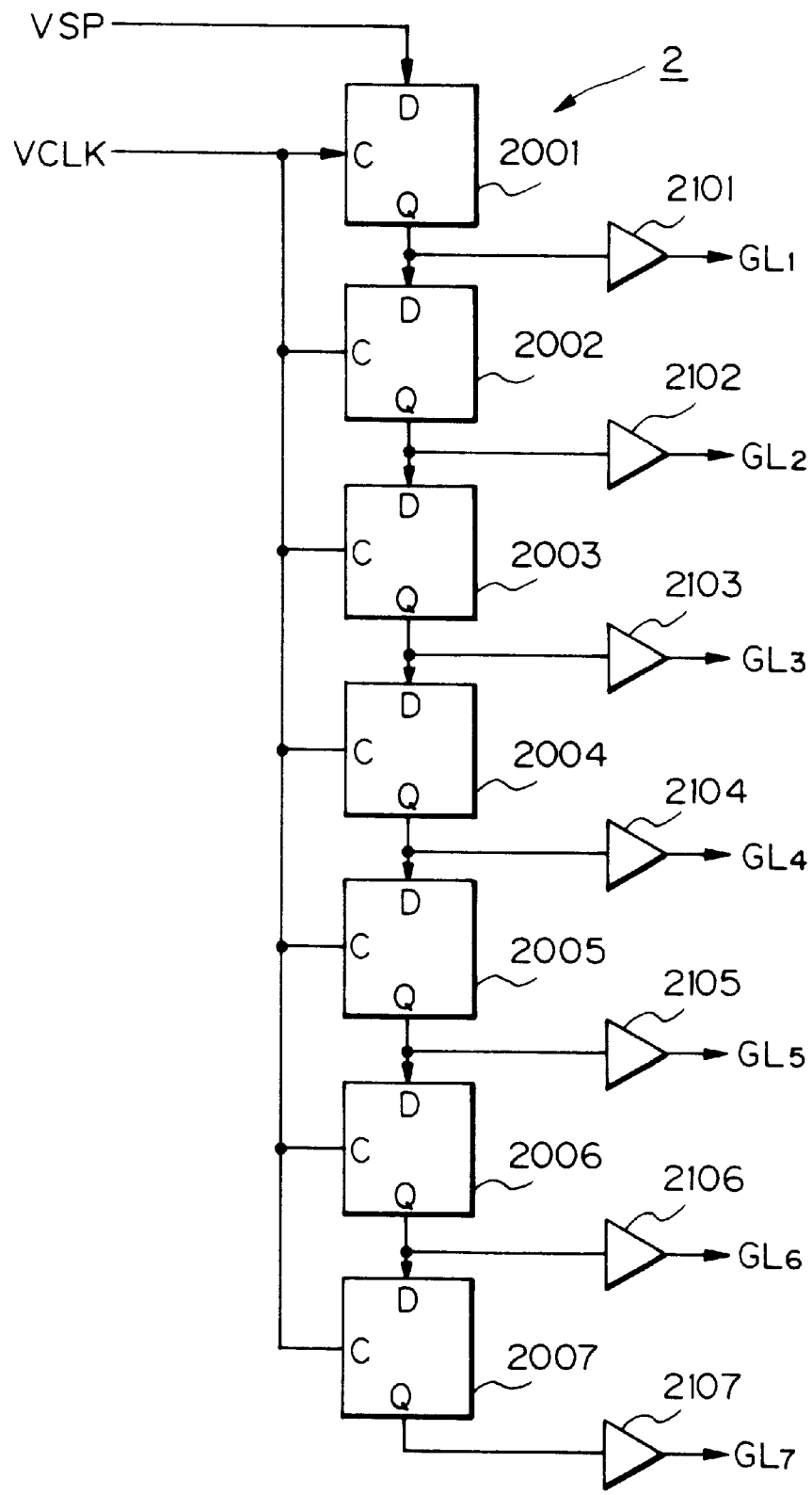
FIG. 2 is a circuit diagram of the gate line driving circuit of FIG. 1.
Figure 3:
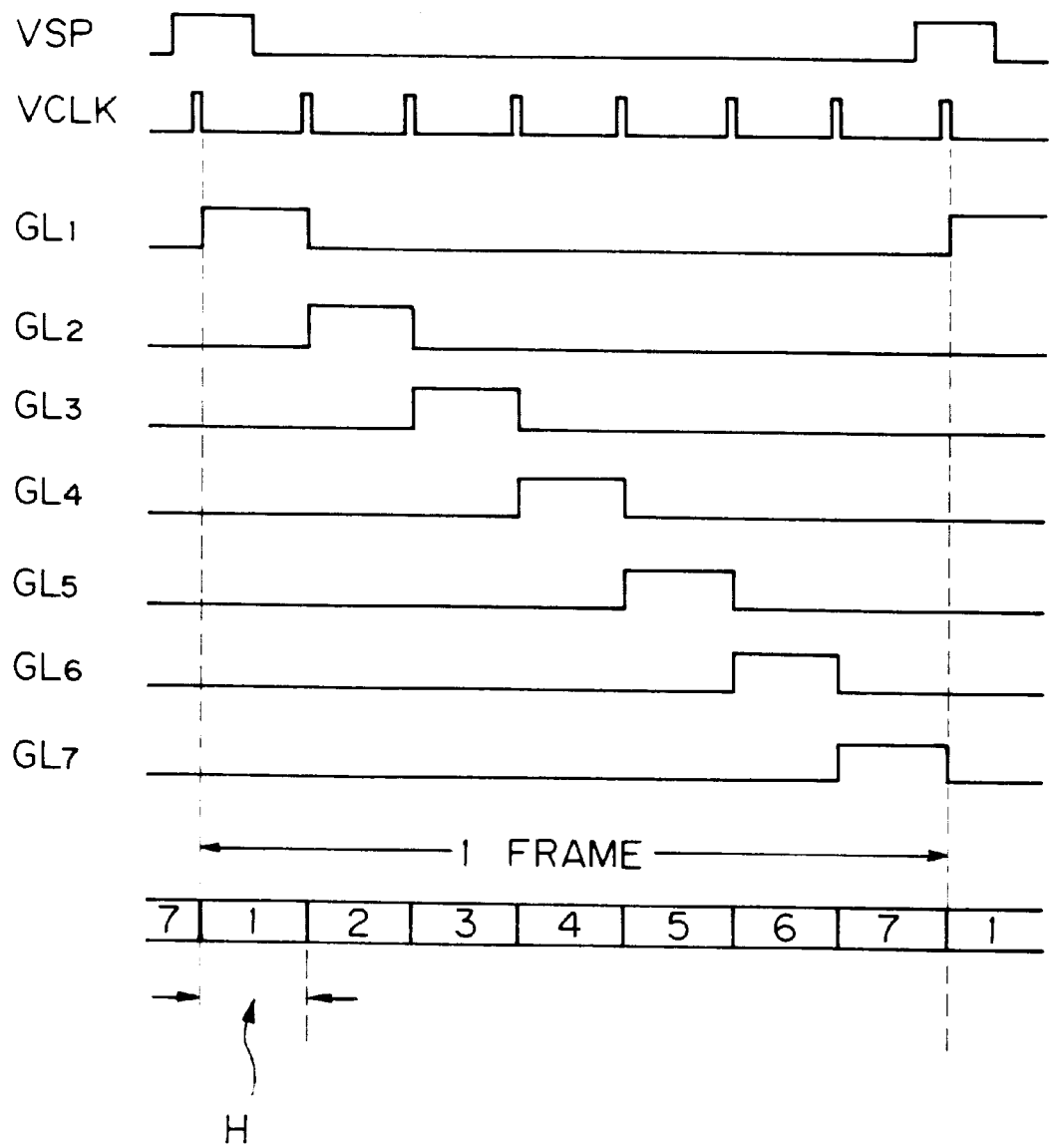
FIG. 3 is a timing diagram for showing the operation of the circuit of FIG. 2.

As illustrated in FIG. 2, the gate line driving circuit 2 is formed by serially-connected D flip-flops 2001, 2002, ... which serve as a shift register. That is, as shown in FIG. 3, the vertical start pulse signal VSP is shifted through the D flip-flops 2001, 2002, ... by the clock signal VCLK. The outputs of the D flip-flops 2001, 2002, ... are connected via buffers 2101, 2102, ... to the gate lines $GL_1$, $GL_2$, .... In this case, the buffers 2101, 2102, ... have level shift functions and power amplifications for driving the gate lines $GL_1$, $GL_2$, ....

In the first prior art apparatus of FIGS. 1 and 2, however, it is impossible to change the number of scanning lines. Therefore, if a television image having a small number of scanning lines is displayed in the LCD panel 1, an interpolation operation may be required, which is complex in control.

Figure 4:
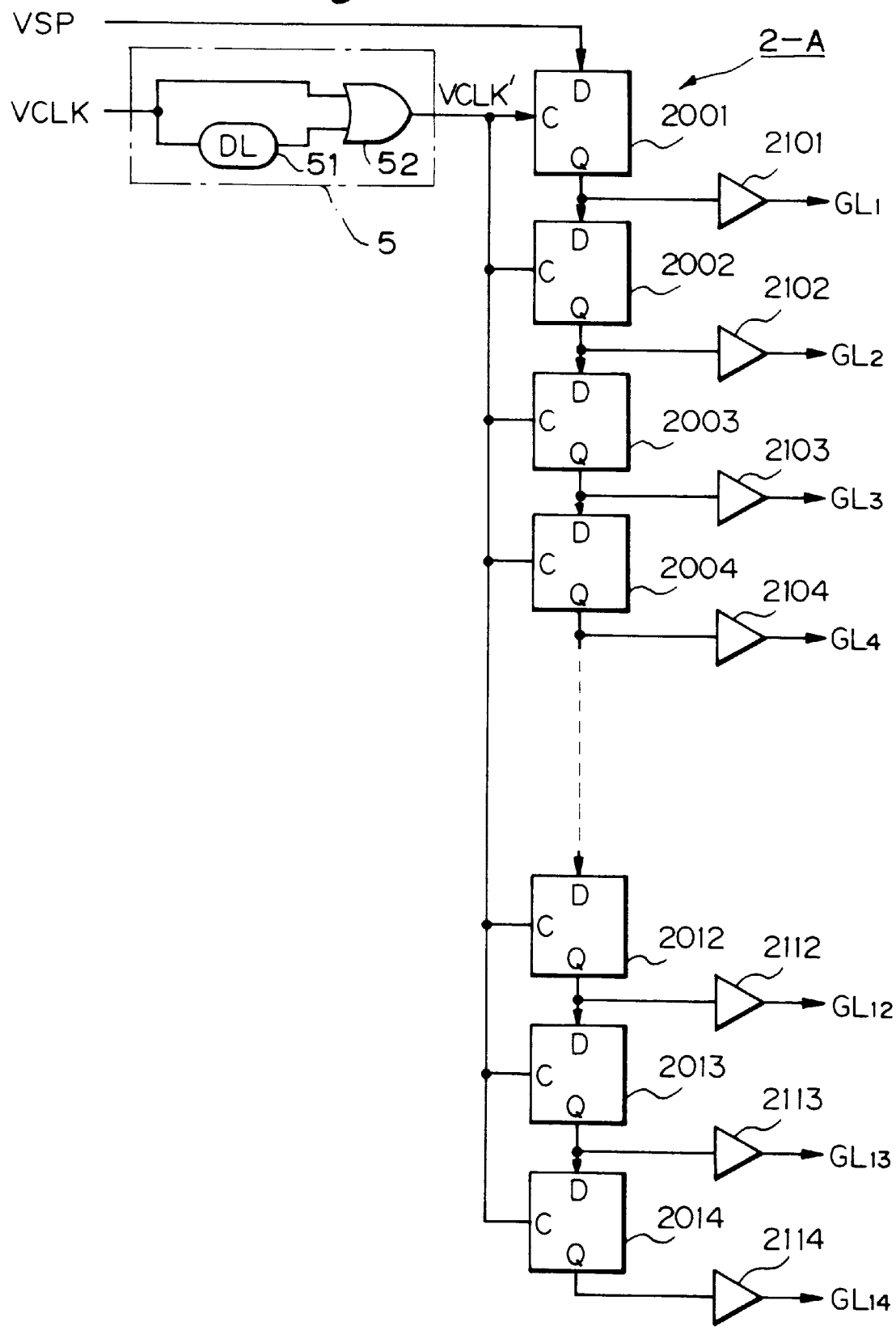
FIG. 4 is a circuit diagram illustrating a second prior art active matrix LCD apparatus.
Figure 5:
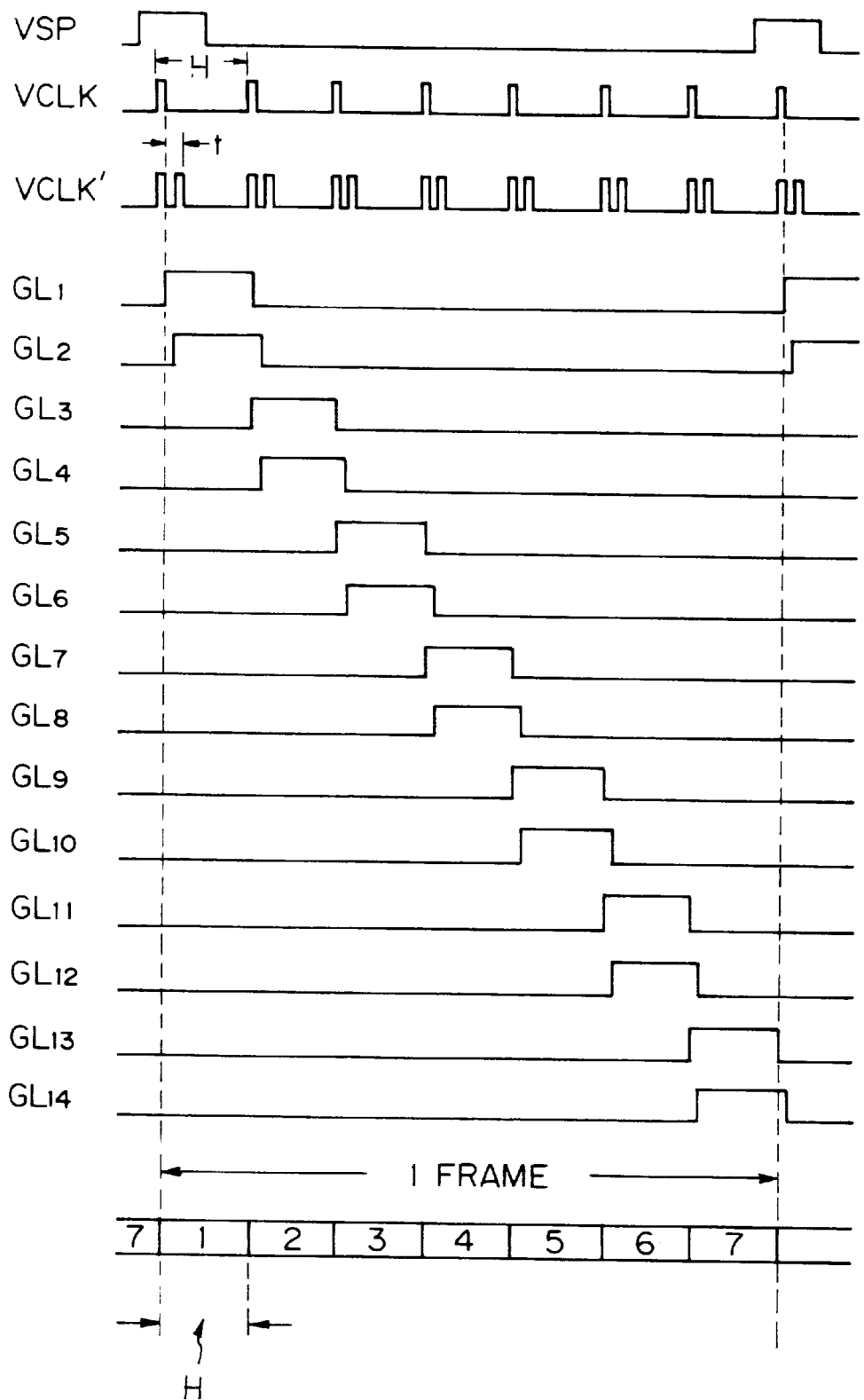
FIG. 5 is a timing diagram for showing the operation of the circuit of FIG. 4.

In FIG. 4, which illustrates a second prior art active matrix LCD apparatus (see JP-A-62-138893), a clock multiplexing circuit 5 is provided between the controller 4 and the gate line driving circuit 2 of FIG. 1 to form a gate line driving circuit 2-A. The clock multiplexing circuit 5 is formed by a delay circuit 51 and an OR circuit 52. In this case, the delay time t of the delay circuit 51 is smaller than the time period H of the clock signal VCLK. Therefore, as shown in FIG. 5, a clock signal VCLK' obtained by the clock multiplexing circuit 5 is formed by pulse groups each including two pulses, and the period of the pulse groups is equal to a one line scan time period (1H). As a result, as shown in FIG. 5, two of the gate lines such as $GL_1$ and $GL_2$ are approximately simultaneously driven. Thus, the displayed area of the LCD panel 1 in the longitudinal direction in FIG. 5 is twice that in FIG. 3.

In the second prior art apparatus of FIG. 4, if the clock multiplexing circuit 5 includes another delay circuit in parallel to the delay circuit 51, the displayed area of the LCD panel 1 in the longitudinal direction can be thrice that in FIG. 3.

In the second prior art apparatus of FIG. 4, however, since the magnification of the displayed area in the longitudinal direction is an integer, the displayed area may be too much smaller or too much larger than the LCD panel 1, in other words, the displayed area hardly coincides with the LCD panel 1.

Figure 6:
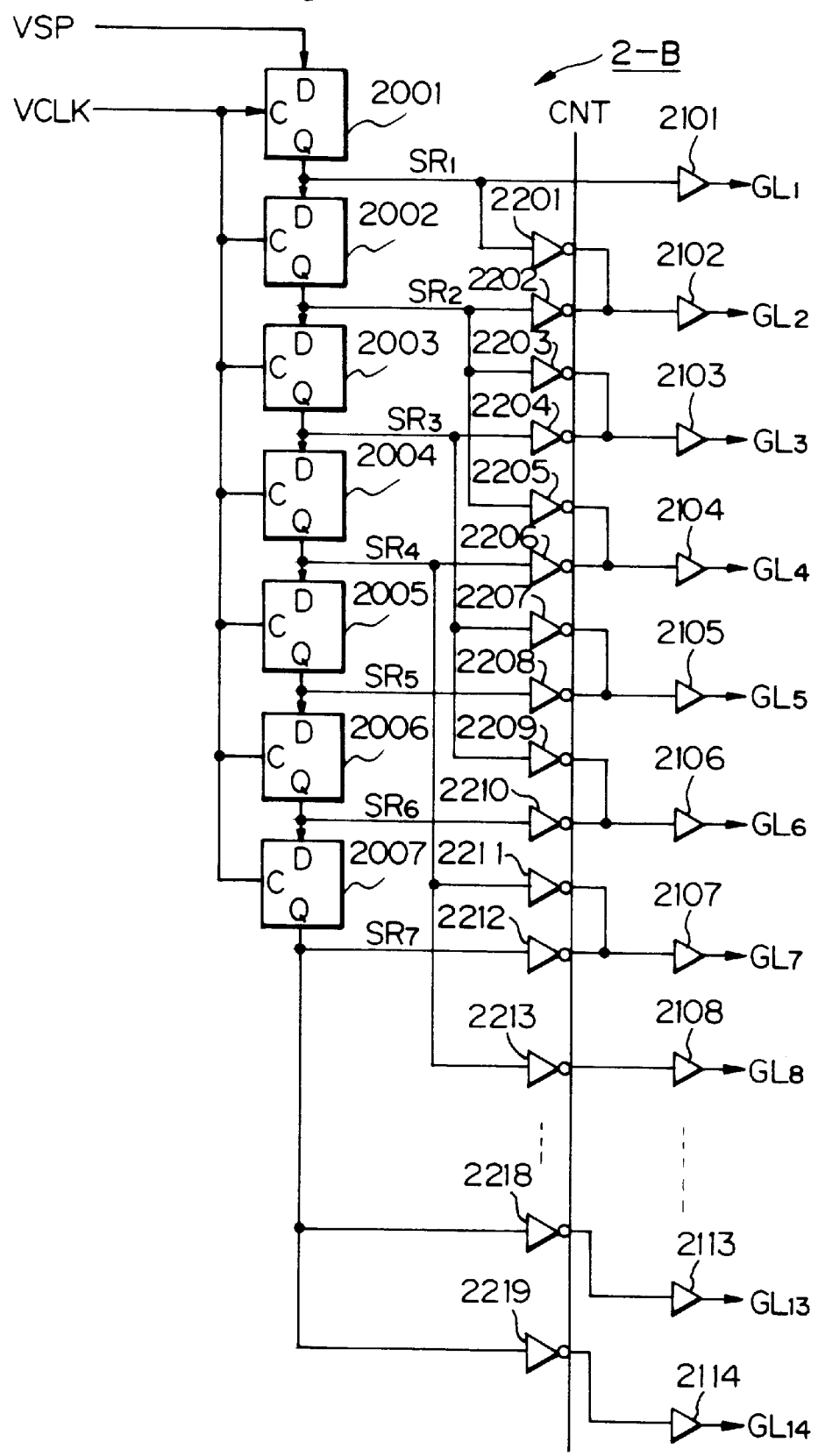
FIG. 6 is a circuit diagram illustrating a third prior art active matrix LCD apparatus.

In FIG. 6, which illustrates a third prior art active matrix LCD apparatus (see JP-A-5-100640), the outputs $SR_1$, $SR_2$, ..., $SR_7$ of the D flip-flops 2001, 2002, ..., 2007 of FIG. 4 are connected to the buffers 2101, 2102, ..., 2114 via clocked inverters 2201, 2202, ..., 2219, instead of the clock multiplexing circuit 5 of FIG. 4, to form a gate line driving circuit 2-B.

The clocked inverters 2201, 2202, ..., 2219 are controlled by a control signal CNT which can be generated from the controller 4 of FIGS. 1. In a usual mode, the control signal CNT is low (="0"), and as a result, the clocked inverters 2202, 2204, 2206, ..., 2212 are activated. Therefore, the outputs $SR_1$, $SR_2$, ... of the D flip-flops 2001, 2002, ..., 2007 become the voltages at the gate lines $GL_1$, $GL_2$, ..., $GL_7$, respectively.

Figure 7:
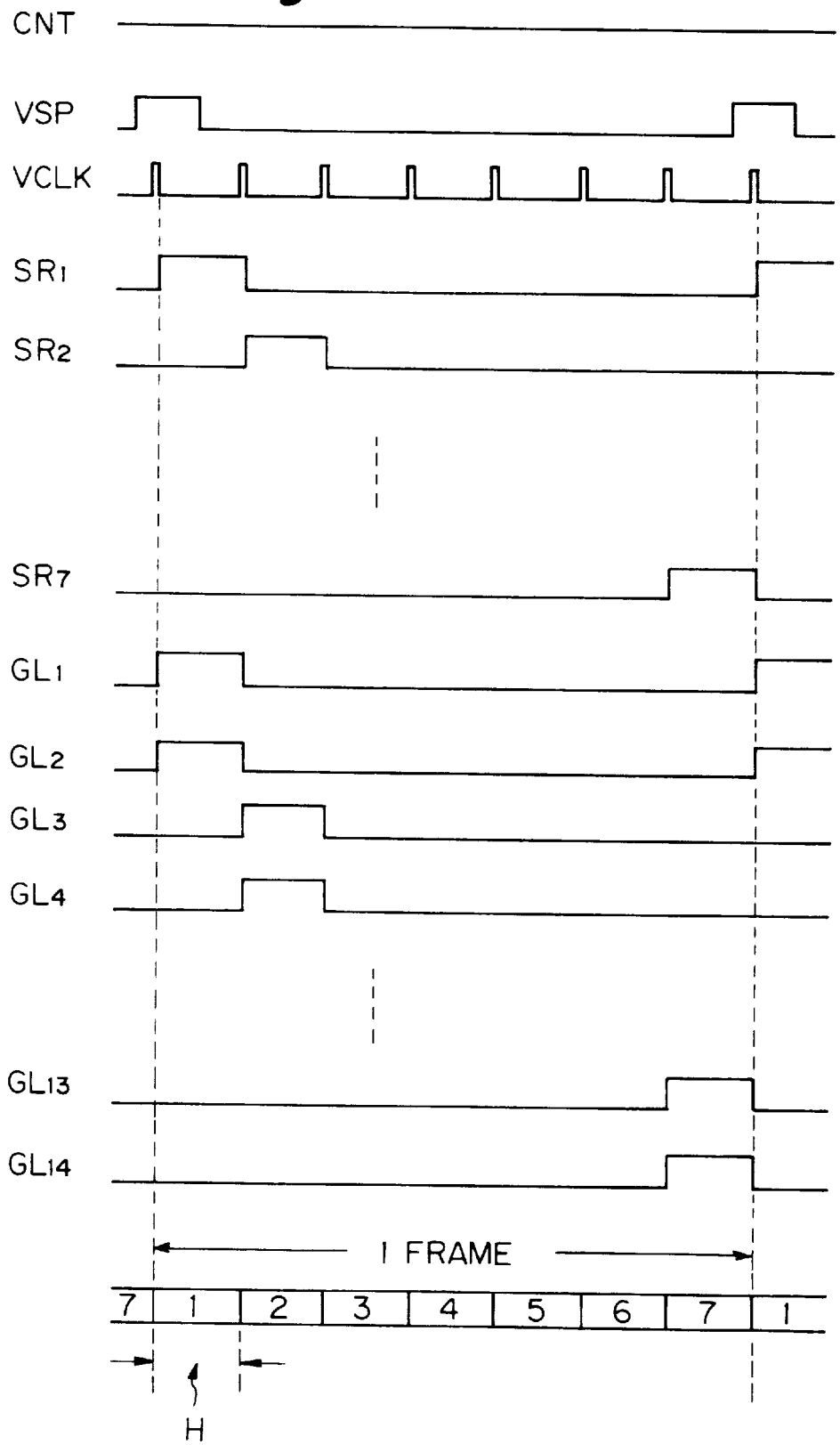
FIG. 7 is a timing diagram for showing the operation of the circuit of FIG. 6.

On the other hand, as shown in FIG. 7, in a magnification mode, the control signal CNT is high (="1"), and as a result, the clocked inverters 2201, 2203, ..., 2211, 2213, 2214, ..., 2219 are activated. Therefore, the output $SR_1$ of the D flip-flop 2001 becomes the voltages at the gate lines $GL_1$ and $GL_2$, the output $SR_2$ of the D flip-flop 2002 becomes the voltages at the gate lines $GL_3$ and $GL_4$, ..., the output $SR_7$ of the D flip-flop 2007 becomes the voltages at the gate lines $GL_{13}$ and $GL_{14}$. Thus, the displayed area of the LCD panel 1 in the longitudinal direction is twice that in the usual mode.

In the third prior art apparatus of FIG. 6, however, although the magnification of the displayed area in the longitudinal direction can be arbitrary, this magnification is fixed. Also, the clocked inverters 2201, 2202, ..., 2219 increase the manufacturing cost. Further, a write operation cannot accurately be carried out for the apparatus which is of a gate storage type where a storage capacitor is formed on an adjacent gate line.

Figure 8:
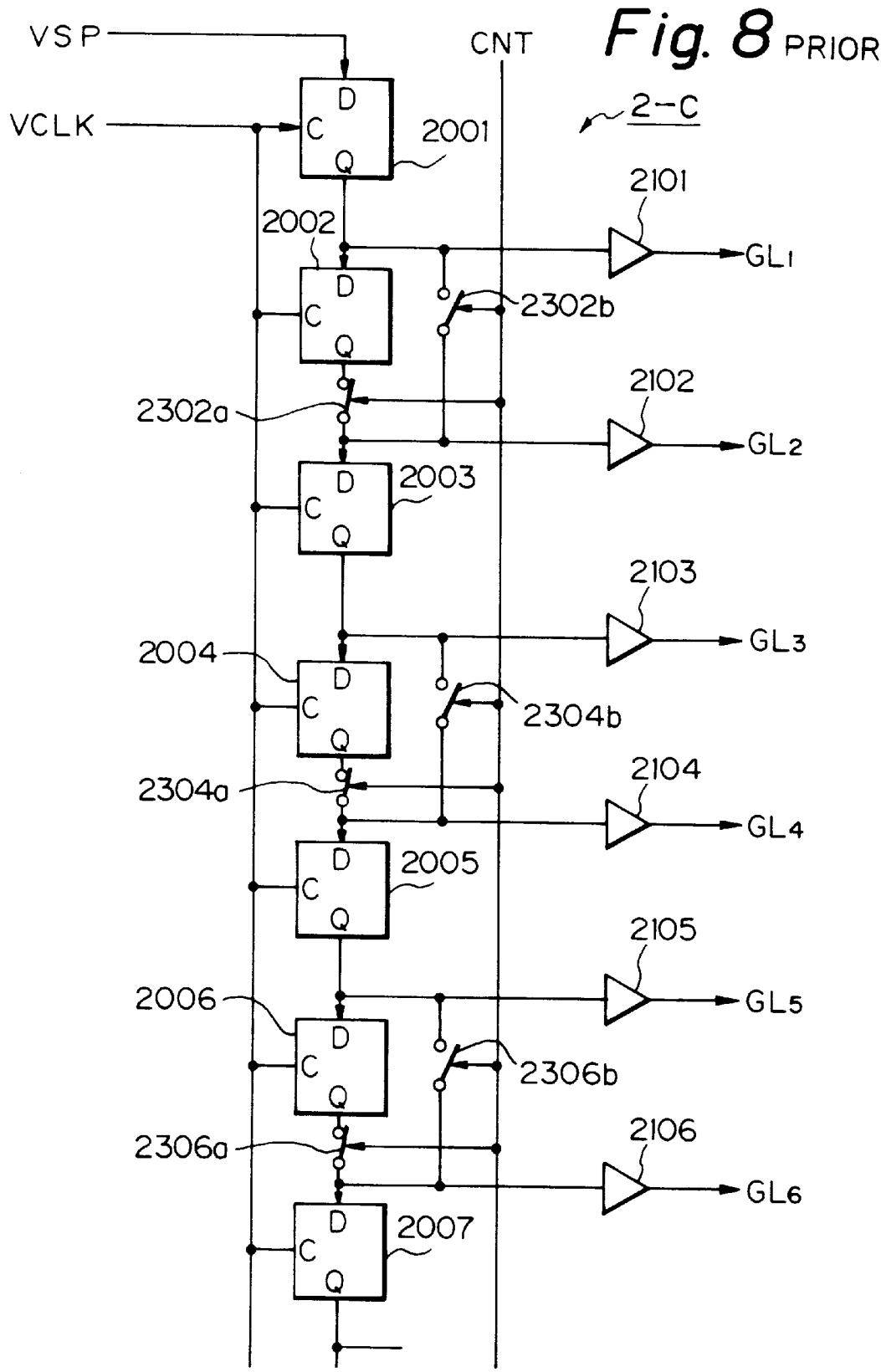
FIG. 8 is a circuit diagram illustrating a fourth prior art active matrix LCD apparatus.

In FIG. 8, which illustrates a fourth prior art active matrix LCD apparatus (see JP-A-5-303362), switches 2302a, 2302b, 2304a, 2304b, ... are provided instead of the clocked inverters 2201, 2202, ... of FIG. 6, to form a gate line driving circuit 2-C.

The clocked inverters switches 2302a, 2302b, 2304a, 2304b, ... are controlled by a control signal CNT which can be generated from the controller 4 of FIG. 1. In a usual mode, the control signal CNT is low (="0"), and as a result, the switches 2302a, 2304a, ... are turned ON while the switches 2302b, 2304b, ... are turned OFF. As a result, the outputs of the D flip-flops 2001, 2002, ... become the voltages at the gate lines $GL_1$, $GL_2$, ..., respectively.

Figure 9:
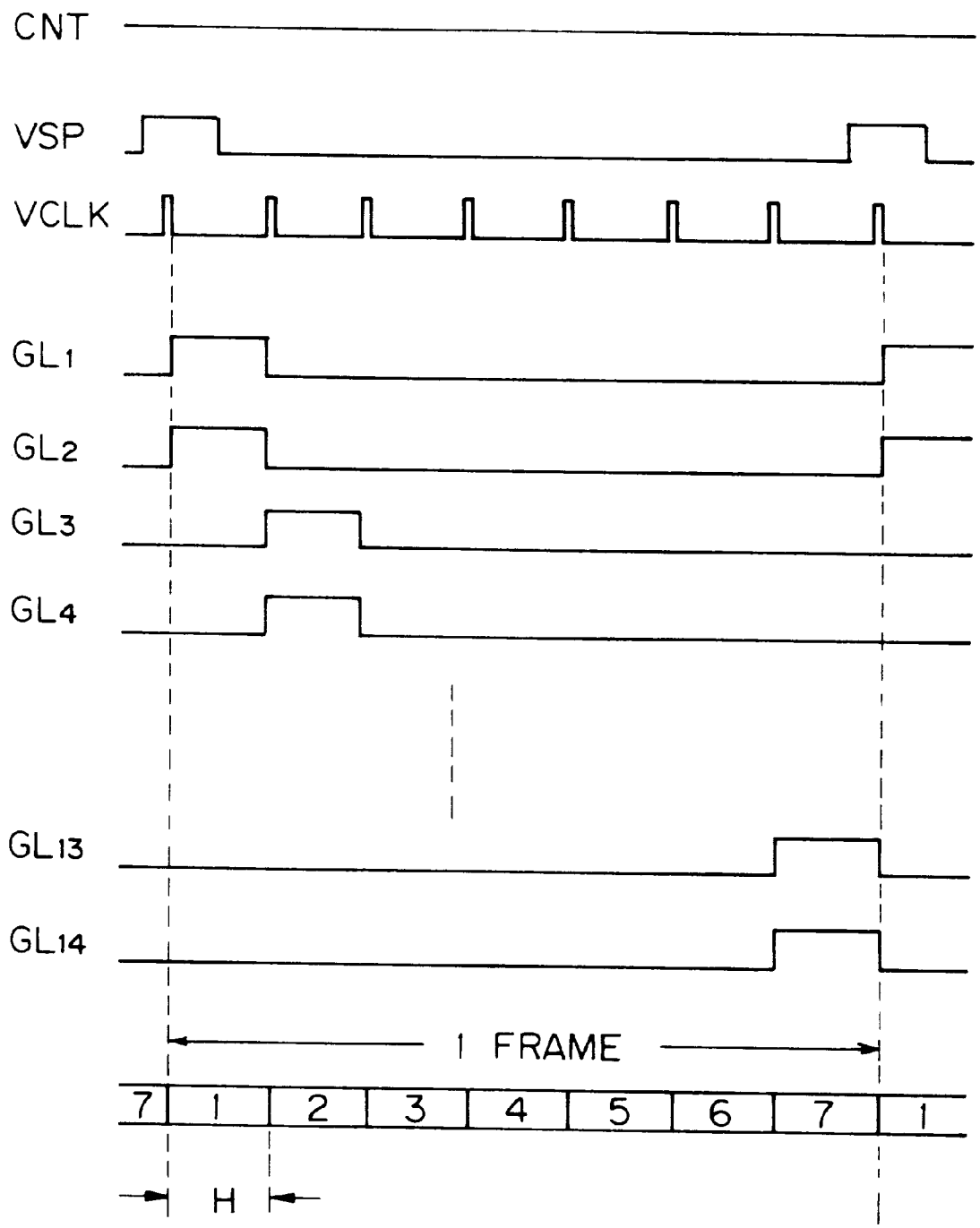
FIG. 9 is a timing diagram for showing the operation of the circuit of FIG. 8.

On the other hand, as shown in FIG. 9, in a magnification mode, the control signal CNT is high (="1"), and as a result, the switches 2302a, 2304a, ... are turned OFF while the switches 2302b, 2304b, ... are turned ON. As a result, the output of the D flip-flop 2001 becomes the voltages at the gate lines $GL_1$ and $GL_2$, the output of the D flip-flop 2002 becomes the voltages at the gate lines $GL_3$ and $GL_4$, .... Thus, the displayed area of the LCD panel 1 in the longitudinal direction is enlarged more than that in the usual mode.

In the fourth prior art apparatus of FIG. 8, however, although the magnification of the displayed area in the longitudinal direction can be arbitrary, this magnification is fixed. Also, the presence of the switches 2302a, 2302b, 2304a, 2304b, ... increases the manufacturing cost. Further, the maximum magnification is 2, and therefore, it is impossible to obtain a magnification of larger than 2.

Figure 10A:
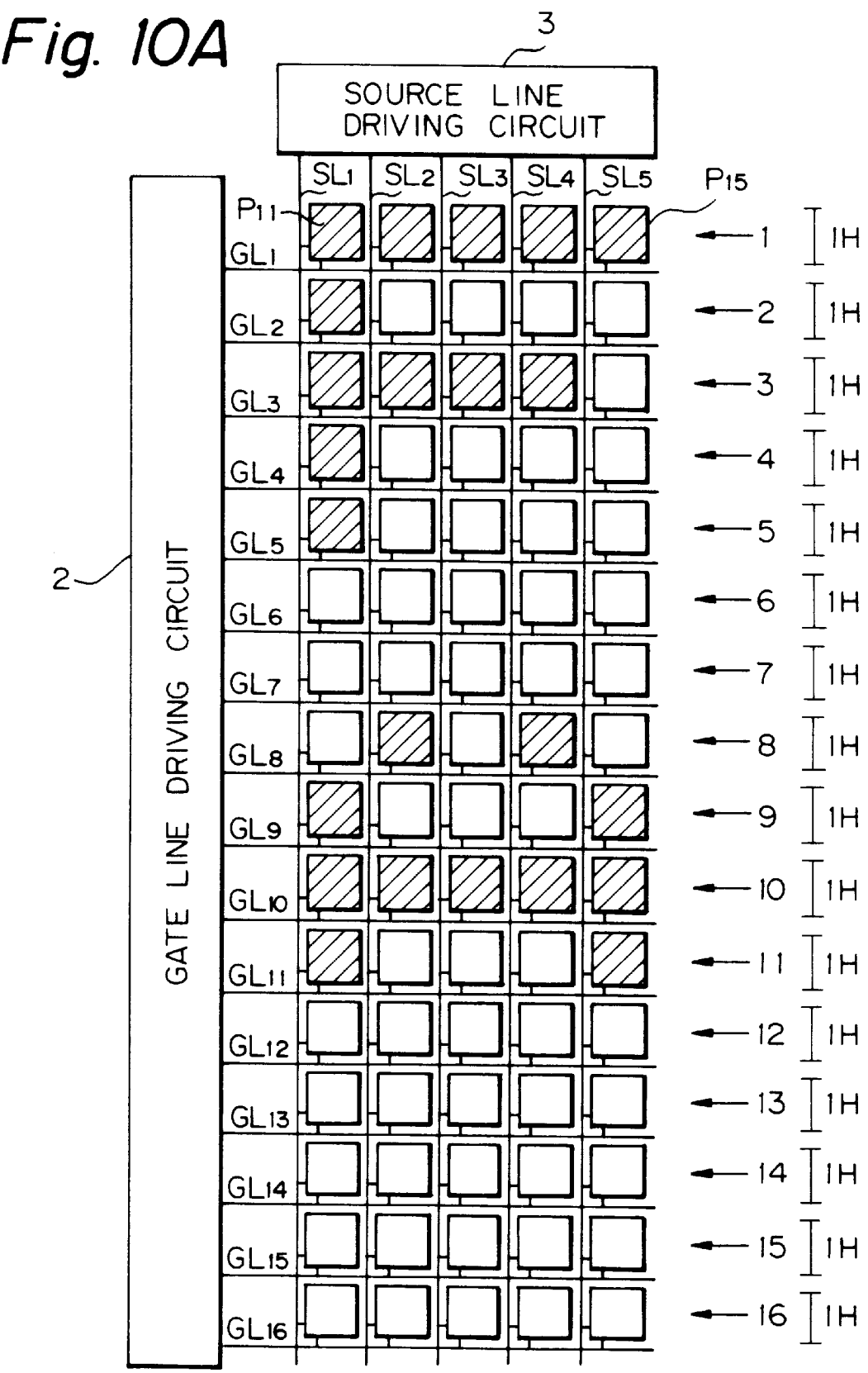
FIGS. 10A and 10B are block diagrams for explaining the principle of the present invention.
Figure 10B:
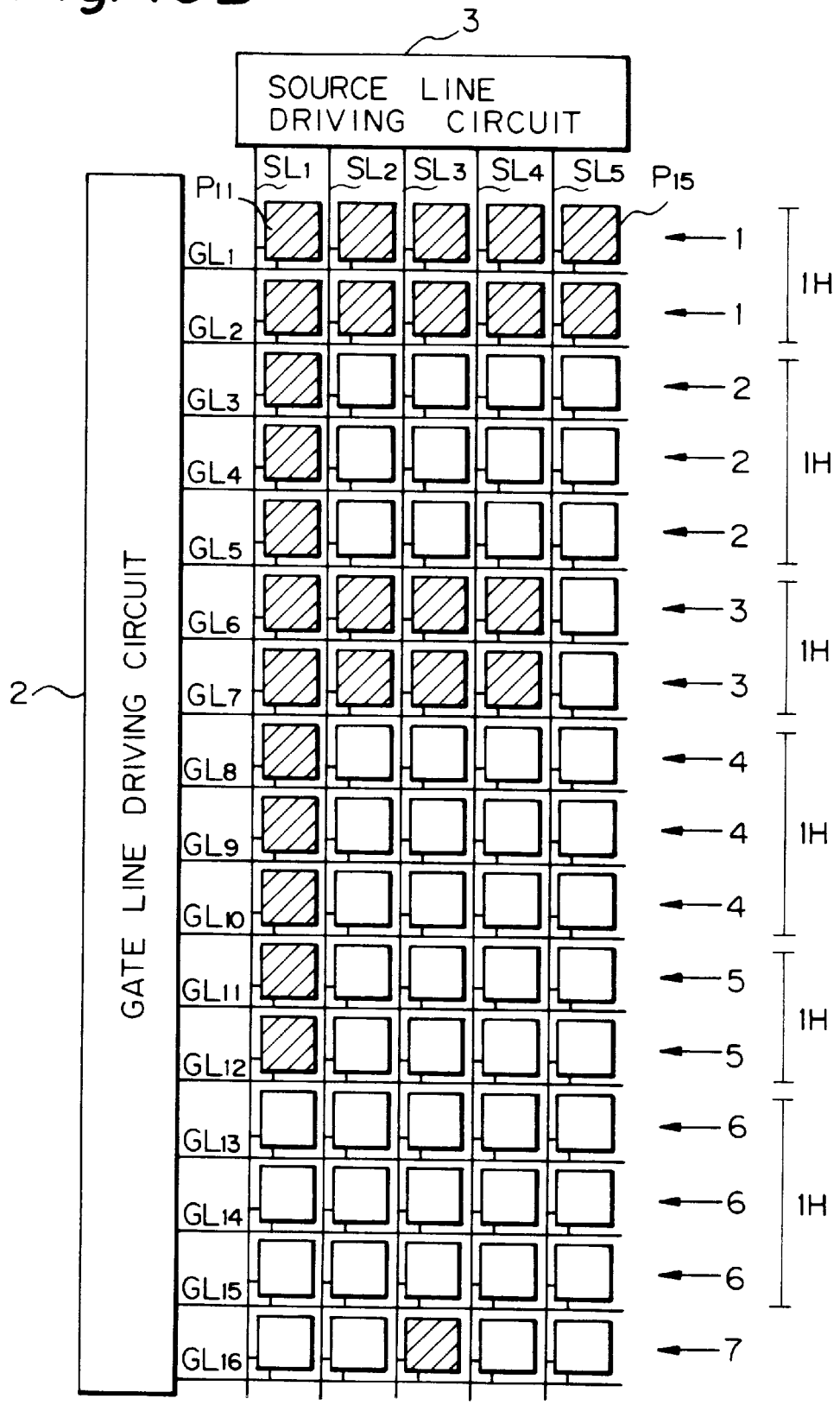

The principle of the present invention will be explained next with reference to FIGS. 10A and 10B.

For example, assume that an LCD apparatus has 600 scanning lines and a line scanning time period (1H) of about 20 $\mu$s to 25 $\mu$s, and a television video signal has 240 scanning lines and a line scanning time period (1H) of about 60 $\mu$s. In this case, when a television video signal is displayed in the LCD apparatus without magnifying the television video signal, a displayed image is as shown in FIG. 10.

On the other hand, if the above-mentioned television video signal is displayed in a full range of the panel of the LCD apparatus, a magnification of 2.5 (≈600/240) is required. According to the present invention, as shown in FIG. 10B, a write operation is carried out for every half time (H/2) of a horizontal scanning time (1H). Also, three of every four write operations are performed upon three lines of the gate lines, respectively, and the other one of every four write operations is performed upon two lines of the gate lines.

Generally, if a magnification M of a displayed image in the LCD apparatus is represented by $$M = a + c/b \qquad (1)$$

where a, b and c are positive integers, and c is smaller than b, one or two clock signal pulses VCLK for the gate line driving circuit 2 are generated at time of H/a. In this case, two clock signal pulses VCLK are generated at a ratio of c/(a·b).

Figure 11:
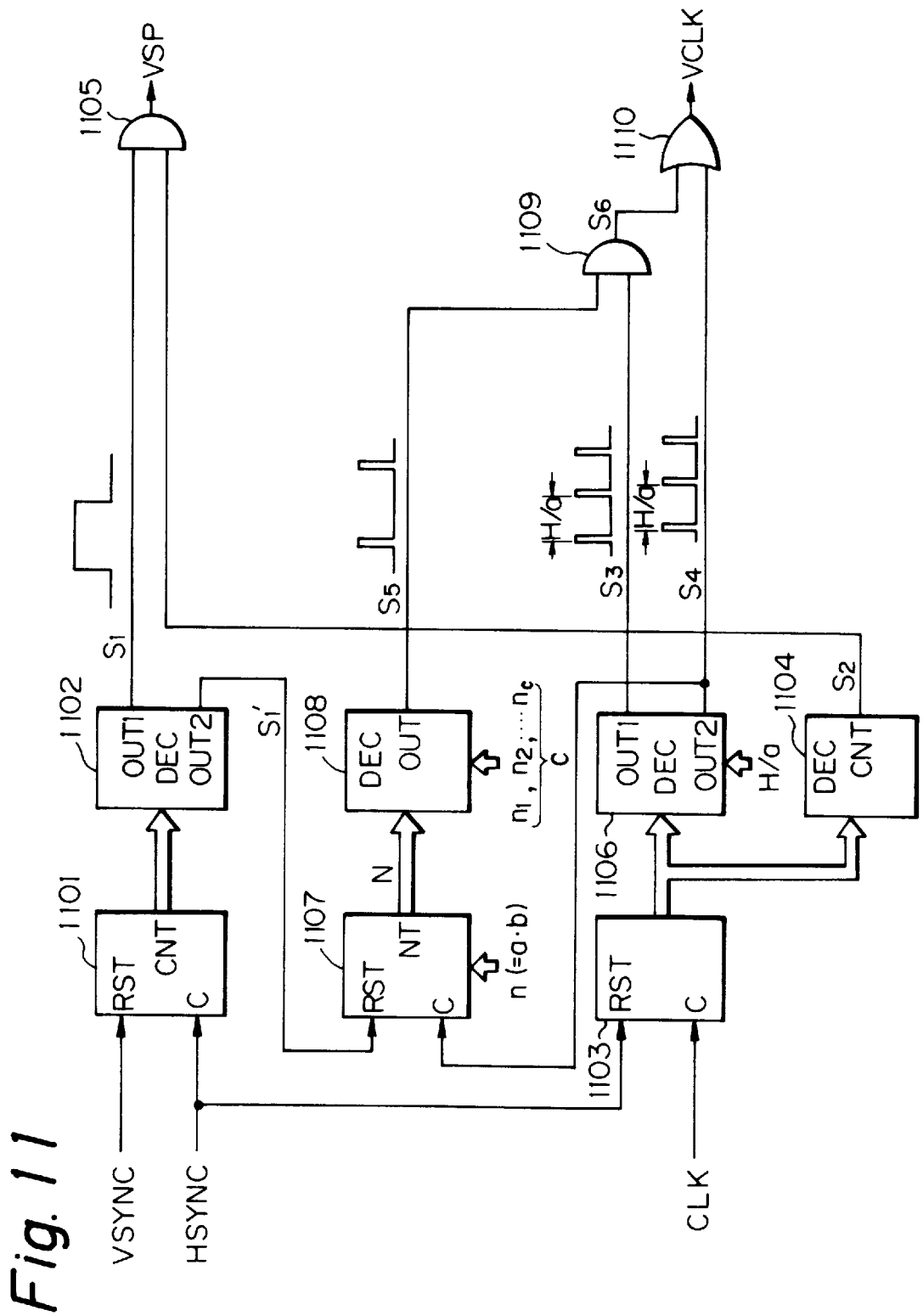
FIG. 11 is a block circuit illustrating a signal generating circuit according to a first embodiment of the present invention.

FIG. 11 is a block circuit diagram of a signal generating circuit for generating the vertical start pulse signal VSP and the clock signal VCLK according to a first embodiment of the present invention. The signal generating circuit of FIG. 11 can be incorporated into the controller 4 of FIG. 1.

The signal generating circuit of FIG. 11 is formed by a counter 1101 and a decoder 1102. The counter 1101 is reset by the vertical synchronization signal VSYN and counts pulses of the horizontal synchronization signal HSYNC. When the number of pulses of the horizontal synchronization signal HSYNC reaches a predetermined value, the decoder 1102 generates a vertical start pulse signal $S_1$ and a signal $S_1'$ similar to the vertical start pulse signal $S_1$.

Also, a dot counter 1103 is provided to count pulses of the clock signal CLK after the horizontal synchronization signal HSYNC is generated. The output of the dot counter 1103 is supplied to decoder 1104. That is, when the output of the dot counter 1103 reaches a predetermined value, the decoder 1104 generates a high level signal $S_2$ and transmits it to an AND circuit 1105. Therefore, the vertical start pulse signal $S_1$ is masked at the AND circuit 1105 by the signal $S_2$ of the decoder 1104.

The dot counter 1103 is connected to a decoder 1106. A value of H/a is preset in the decoder 1106. Therefore, the decoder 1106 generates pulse signals $S_3$ and $S_4$ whose periods are H/a. In this case, the pulse signal $S_3$ is advanced in phase a little more than the pulse signal $S_4$. In this case, the interval between the pulse signals $S_3$ and $S_4$ is larger than a delay time of the gate lines $GL_1$, $GL_2$, ....

Also, an n-ary counter 1107 is reset by the output signal $S_1'$ of the decoder 1102 and counts pulses of the pluse signal $S_4$ of the decoder 1106. Note that the value n (=a·b) is preset in the n-ary counter 1107. Therefore, the n-ary counter 1107 generates a digital value N (=0, 1, ..., n−1) and transmits it to a decoder 1108.

Values $n_1, n_2, \ldots, n_c$ are preset in registers of the decoder 1108. In this case, $$0 \le n_1 < n_2 < \ldots < n_c \le n-1$$

Therefore, when the value N of the counter 1107 reaches $n_1, n_2, \ldots,$ or $n_c$, the decoder 1108 generates a pulse signal $S_5$ and transmits it to an AND circuit 1109. As a result, the pulse signal $S_3$ of the decoder is masked at the AND circuit 1109 by the pulse signal $S_5$, to generate an additional pulse signal $S_6$.

Further, an OR circuit 1110 combines the pulse signal $S_4$ with the additional pulse signal $S_6$ to generate the clock signal VCLK.

Thus, the clock signal VCLK includes (n+c) pulses per every time period (H/a)·n, i.e., (n+c)/[(H/a)·n]
=(a·b+c)/(H·b) (n=a·b)
=(a+c/b)/H
=M/H Therefore, a displayed image having a magnification of M can be displayed on the LCD panel 1.

The operation of the signal generating circuit of FIG. 11 incorporated into the LCD apparatus of FIGS. 1 and 2 will be explained next with reference to FIGS. 12A and 12B.

Figure 12A:
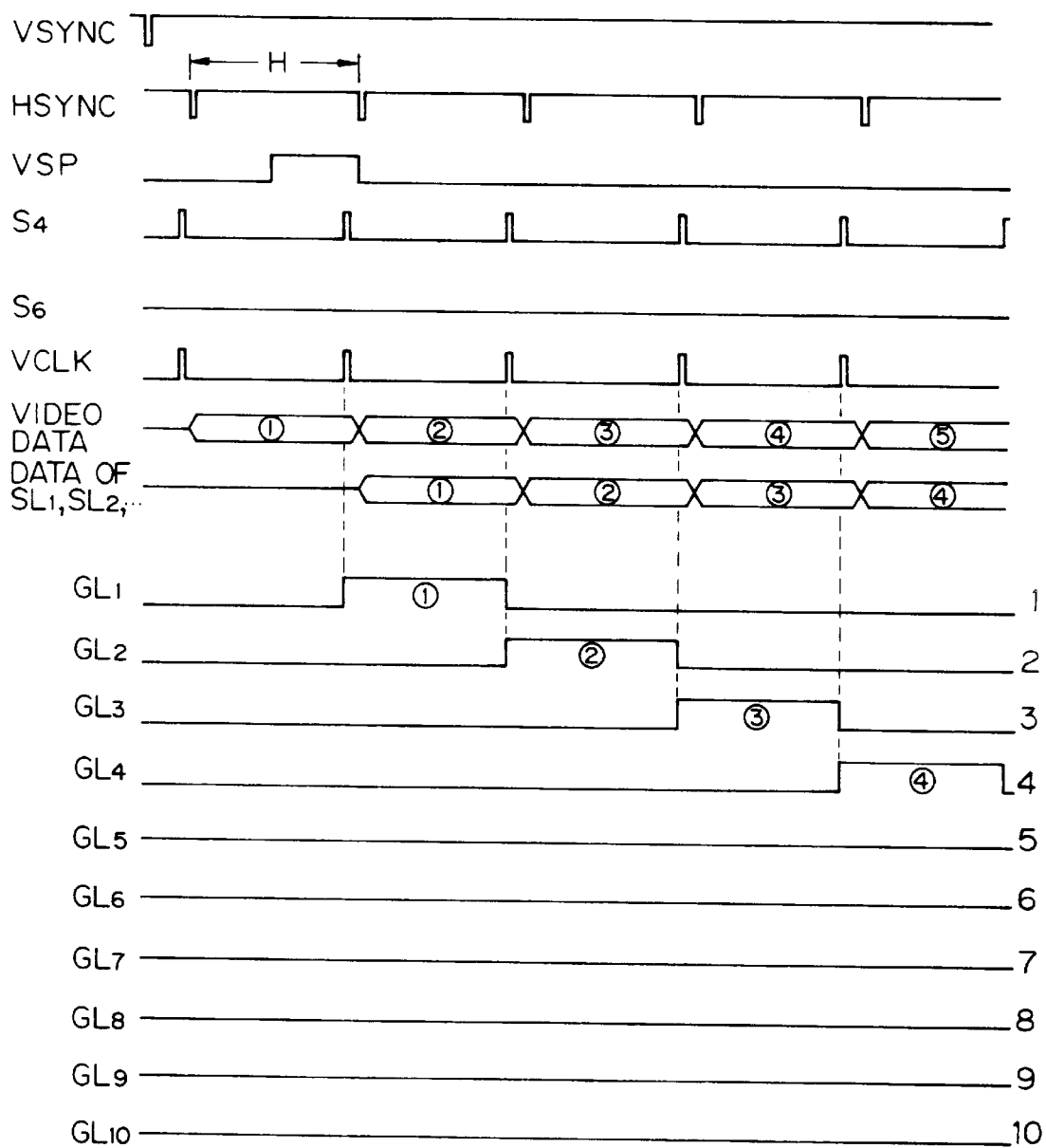
FIGS. 12A and 12B are timing diagrams for showing the operation of the circuit of FIG. 11 including the apparatus of FIGS. 1 and 2.

In FIG. 12A, the magnification M is 1, and in this case, a=b=1 and c=0 (see formula (1)). Therefore, the decoder 1106 generates a pulse signal $S_4$ having a period of H. On the other hand, since n=1, no value is preset in the registers of the decoder 1108, so that the output $S_6$ of the decoder 1108 is not generated. Therefore, the additional pulse signal $S_6$ is not generated, so that the clock signal VCLK is the same as the pulse signal $S_4$. That is, the pulses of the clock signal VCLK are generated at every time period H of the horizontal synchronization signal HSYNC, so that video data ①, ②, ③, ... are written into the pixels at the gate lines $GL_1$, $GL_2$, $GL_3$, ... sequentially.

Figure 12B:
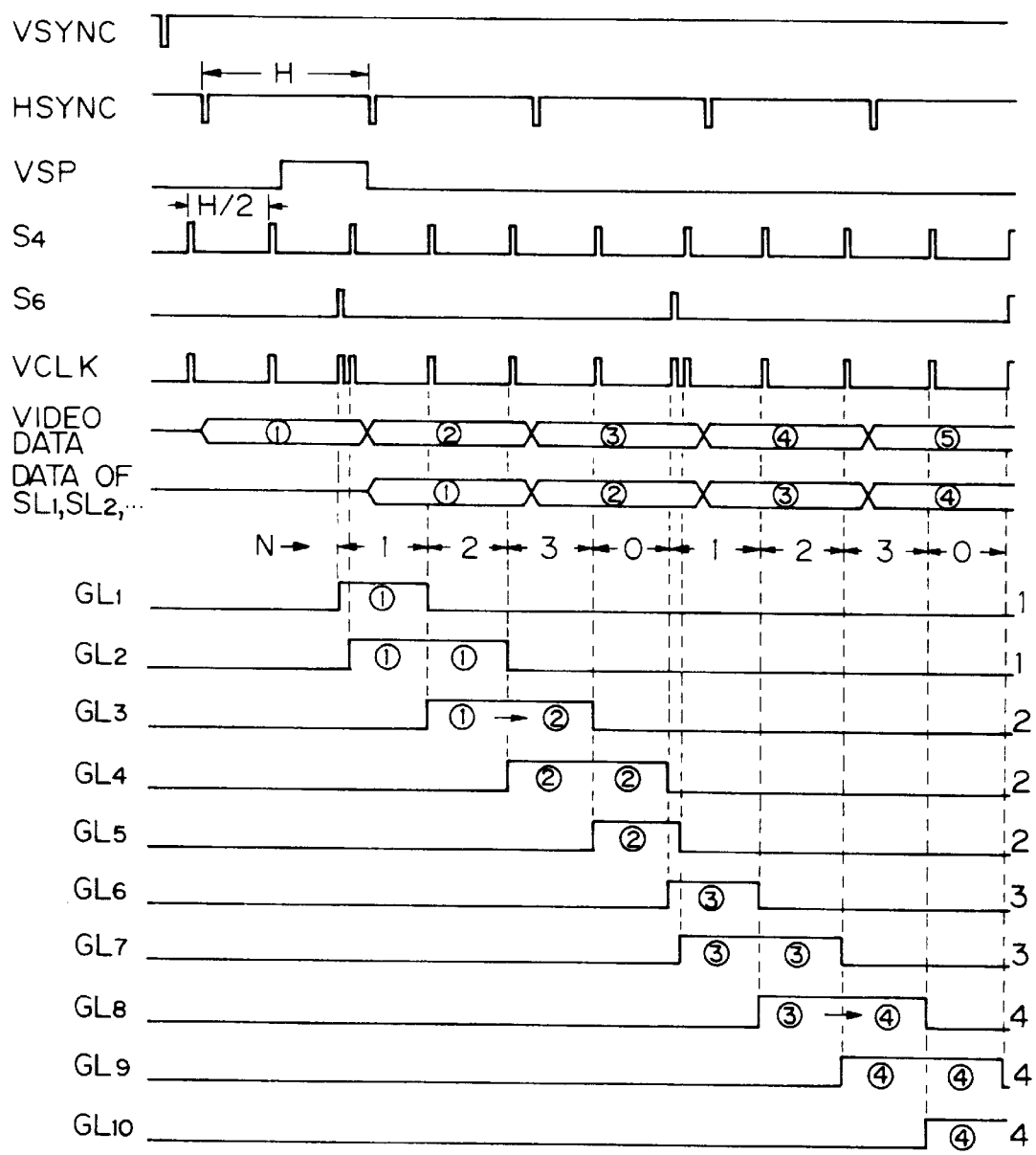

In FIG. 12B, the magnification M is 2.5, and in this case, a=b=2 and c=1 (see formula (1)). Therefore, the decoder 1106 generates a pulse signal $S_4$ having a period of H/2. On the other hand, since n=4, the counter 1107 is a 4-ary counter, so that the counter 1107 generates 0, 1, 2, 3, 0, 1, 2, 3, .... Also, a value "1" is preset in one of the registers of the decoder 1108, so that the output $S_6$ of the decoder 1108 is generated every time the value N reaches "1". Therefore, the additional pulse signal $S_6$ is generated, so that the clock signal VCLK is the pulse signal $S_4$ plus the additional pulse signal $S_6$. That is, the pulses of the clock signal VCLK are generated at every half time period H/2 of the horizontal synchronization signal HSYNC. In this case, two pulses are generated at a timing when N equals 1, so that video data ① is written into the pixels at the gate lines $GL_1$ and $GL_2$, video data ② is written into the pixels at the gate lines $GL_3$, $GL_4$ and $GL_5$, video data ③ is written into the pixels at the gate lines $GL_6$ and $GL_7$, and video data ④ is written into the pixels at the gate lines $GL_8$, $GL_9$ and $GL_{10}$.

Thus, in FIG. 12B, two rows of video data are written into the pixels at five gate lines.

Figure 13:
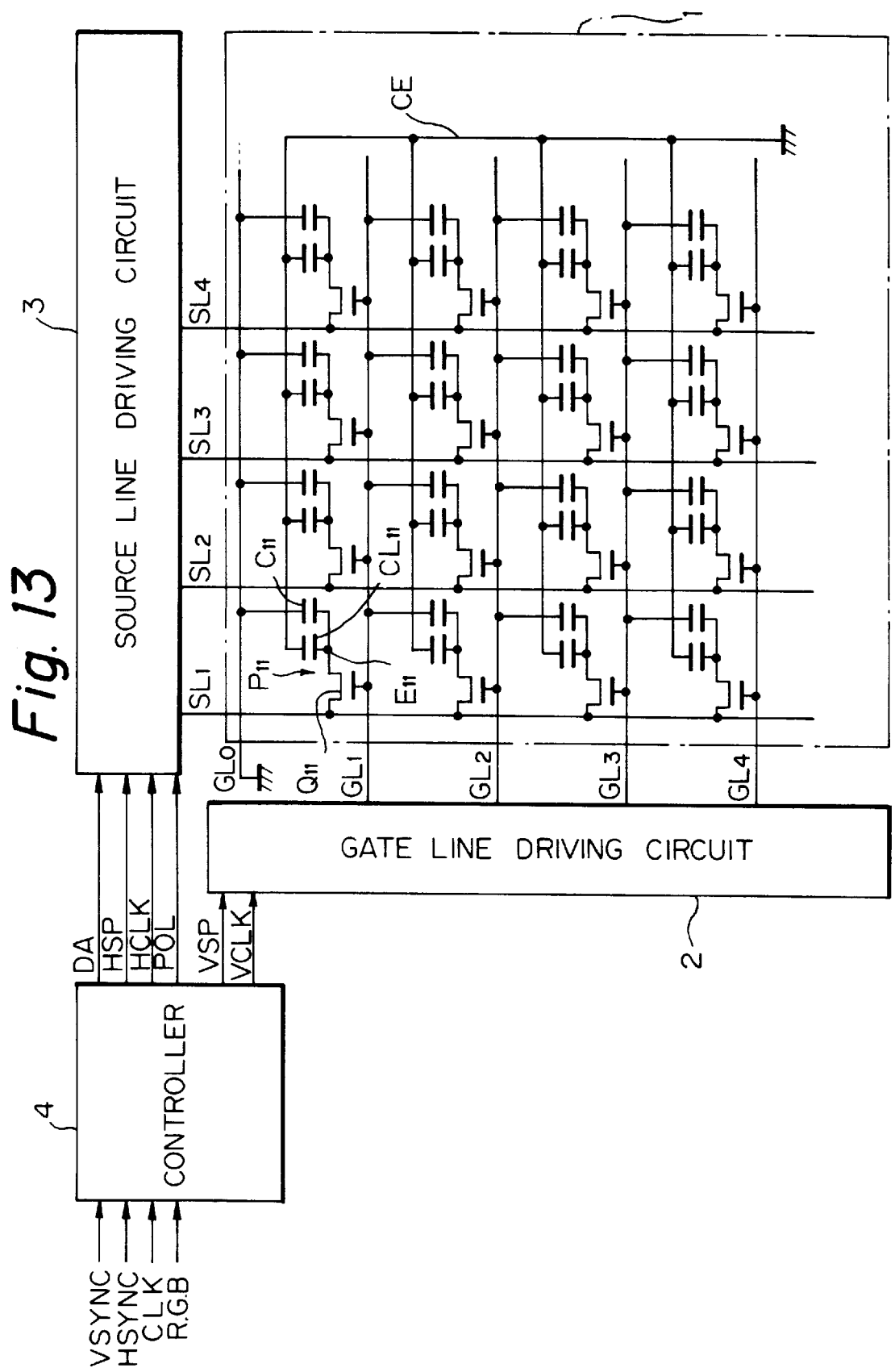
FIG. 13 is a block circuit diagram illustrating a second embodiment of the LCD apparatus according to the present invention.

In FIG. 13, which illustrates a second embodiment of the present invention, the controller 4 also generates a polarity signal POL and transmits it to the source line driving circuit 3.

Figure 14:
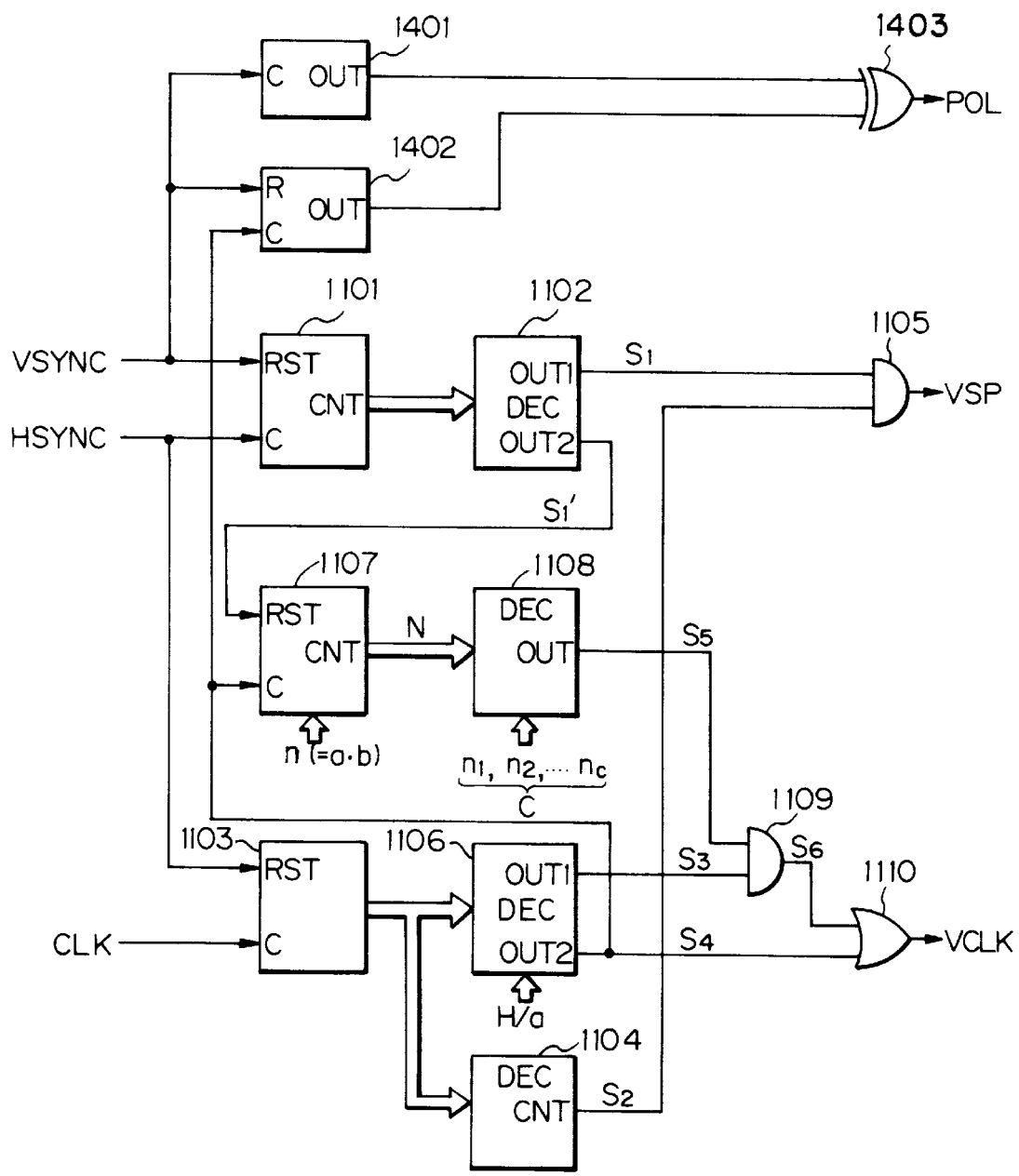
FIG. 14 is a block circuit illustrating the signal generating circuit of the controller of FIG. 13.

As illustrated in FIG. 14, the polarity signal POL is generated by toggle flip-flops 1401 and 1402, and an exclusive OR circuit 1403. That is, the toggle flip-flop 1401 receives the vertical synchronization signal VSYNC as a clock signal. Also, the toggle flip-flop 1402 is reset by the vertical synchronization signal VSYNC, and receives the pulse signal $S_4$ of the decoder 1106 as a clock signal. Further, the outputs of the toggle flip-flops 1401 and 1402 are supplied to the exclusive OR circuit 1403. As a result, the polarity signal POL is inverted at each half period of the video data as shown in FIGS. 15A and 15B.

Figure 15A:
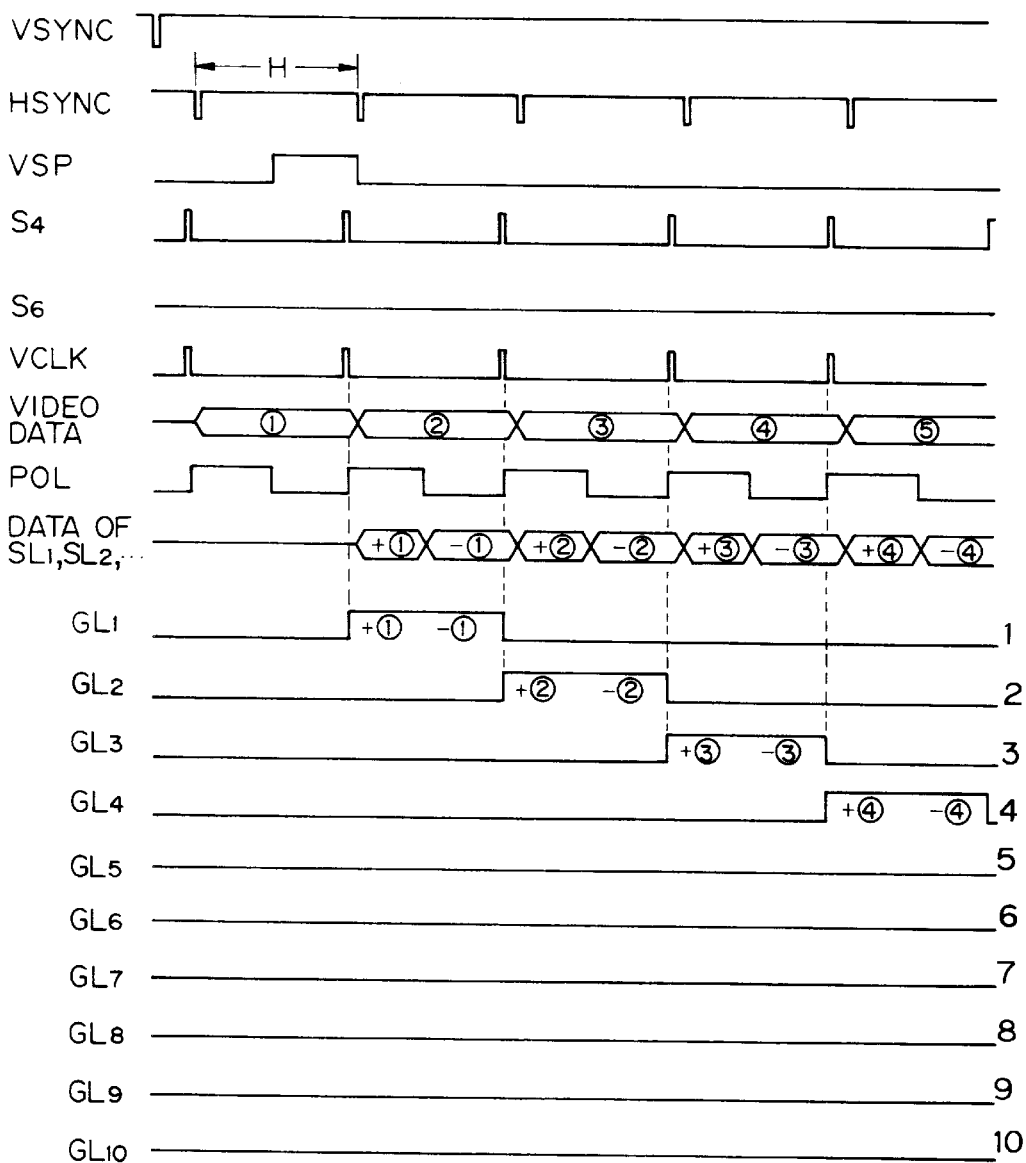
FIGS. 15A and 15B are timing diagrams for showing the operation of the circuit of FIG. 13.
Figure 15B:
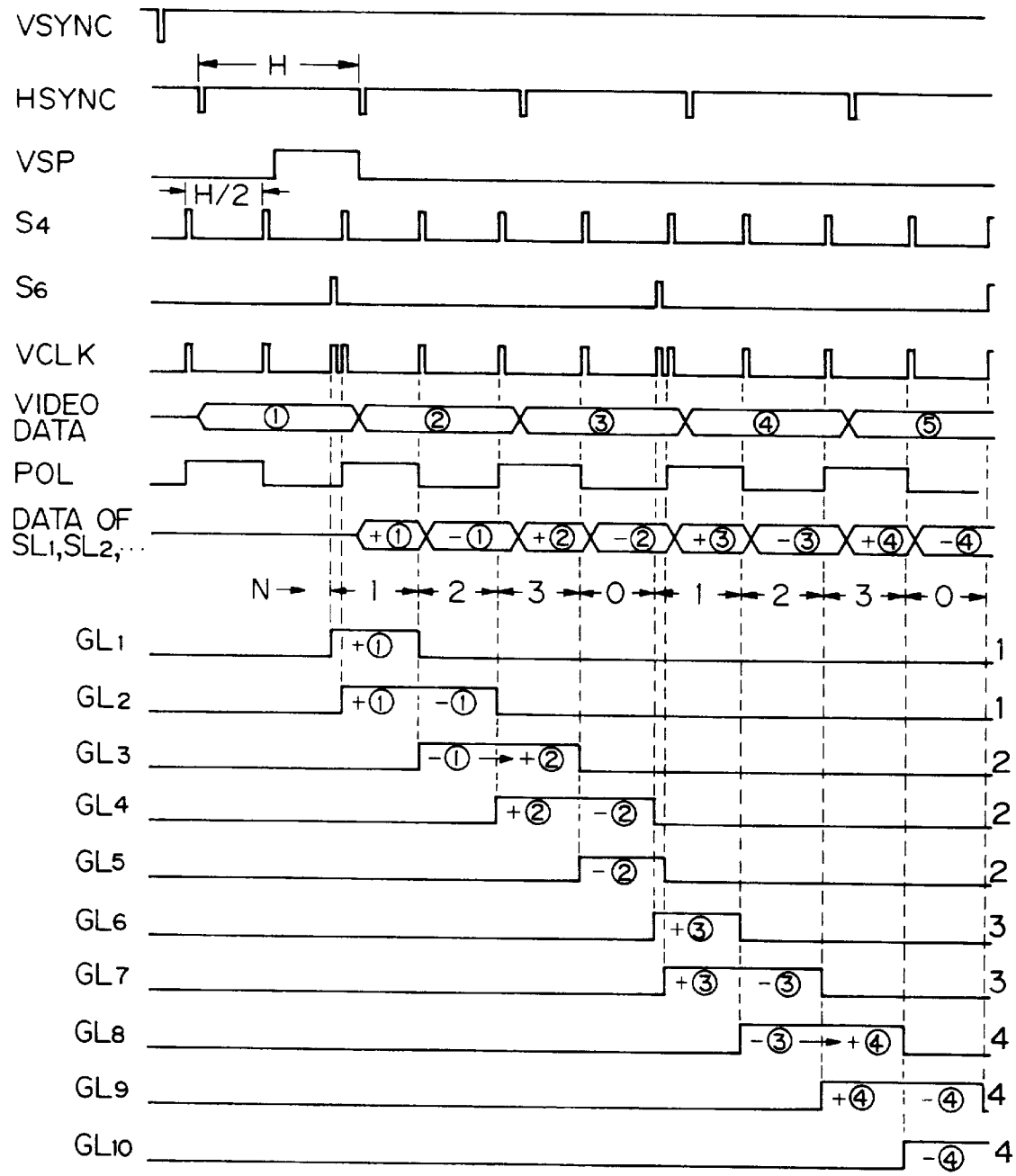

In FIGS. 15A and 15B, which correspond to FIGS. 12 and 12B, write operation time periods upon the pixels are the same for the entire panel. For example, in FIG. 12B, a writing operation time of video data ① into the pixels at the gate line $GL_1$ is H, and a writing operation time of video data ① written into the pixels at the gate line GL$_2$ is 2H. Contrary to this, in FIG. 15B, a writing operation time of video data ① into the pixels at the gate line GL$_1$ is H, and a writing operation time of video data ① written into the pixels at the gate line GL$_2$ is also H, since the polarity of video data ① is changed from +① to −①. This improves the picture quality.

Note that the present invention can be applied to other magnifications of displayed image larger than 1.

As explained hereinabove, according to the present invention, an arbitrary magnification of displayed image represented by M=a+c/b can be obtained.

I claim:

1. A liquid crystal display apparatus capable of generating an image, said image having a magnification M where M is a real number having an integer portion "a" defined by said magnitude M and equal to the numerical value of said magnitude M truncated to the nearest integer, and a decimal portion defined by said magnitude M and equal to M−a, said decimal portion defining quantities "b" and "c" such that "b" and "c" are positive integers, c/b is approximately equal to said decimal portion if M≠0, and "c"=0 and "b"=1 if M−a=0, said liquid crystal display apparatus comprising:
a plurality of gate lines;
a plurality of source lines;
a plurality of liquid crystal pixels each connected to one of said gate lines and one of said source lines;
a gate line driving circuit, connected to said gate lines, for driving said gate lines, said gate line driving circuit being formed by shift registers for shifting a vertical start pulse signal in response to a clock signal including first pulses and second pulses;
means for generating said first pulses at an interval of H/a where H is a time period of a horizontal synchronization signal; and
means for generating said second pulses associated with "c" pulses of "a·b" successive ones of said first pulses.

2. The apparatus as set forth in claim 1, wherein an interval between said first pulses and said pulses is larger than a delay time of said gate lines.

3. The apparatus as set forth in claim 1, further comprising means for inverting polarities of outputs of said source lines in response to said first pulses of said clock signal.

4. A liquid crystal display apparatus capable of generating an image, said image having a magnification M where M is a real number having an integer portion "a" defined by said magnitude M and equal to the numerical value of said magnitude M truncated to the nearest integer, and a decimal portion defined by said magnitude M and equal to M−a, said decimal portion defining quantities "b" and "c" such that "b" and "c" are positive integers c/b is approximately equal to said decimal portion if M≠0, and "c"=0 and "b"=1 if M−a=0, said liquid crystal display apparatus comprising:
a plurality of gate lines;
a plurality of source lines;
a plurality of liquid crystal pixels each connected to one of said gate lines and one of said source lines;
a gate line driving circuit, connected to said gate lines, for driving said gate lines, said gate line driving circuit being formed by shift registers for shifting a vertical start pulse signal in response to a clock signal including first pulses and second pulses;
a first counter for generating a first count signal which is cleared by a horizontal synchronization signal;
a first decoder, connected to said first counter, for counting said first count signal to generate said first and second pulses at an interval of H/a where H is a time period of said horizontal synchronization signal, said first and second pulses being different in phase from each other;
an "n"-ary counter, connected to said first decoder, for counting said first pulses,
a second decoder, connected to said "n"-ary counter, for generating a mask signal when a count value of said "n"-ary counter reaches at least one preset value;
a first gate circuit, connected to said first and second decoders, for masking said second pulses with said mask signal; and
a second gate circuit, connected to said first decoder and said first gate circuit, for combining said first pulses with said masked second pulses to form said clock signal.

5. The apparatus as set forth in claim 4, wherein "n" is "a·b".

6. The apparatus as set forth in claim 4, wherein said preset values are $n_1, n_2, \ldots, n_c$ where $0 \leq n_1 < n_2 < \ldots n_c \leq n-1$.

7. The apparatus as set forth in claim 4, wherein an interval between said first pulses and said pulses is larger than a delay time of said gate lines.

8. The apparatus as set forth in claim 4, further comprising means for inverting polarities of outputs of said source lines in response to said first pulses of said clock signal.

* * * * *